United States Patent
Kikuhara et al.

(10) Patent No.: US 8,025,710 B2
(45) Date of Patent: Sep. 27, 2011

(54) TUNGSTEN ALLOY GRAINS, PROCESSING METHOD USING THE SAME, AND METHOD FOR MANUFACTURING THE SAME

(75) Inventors: Shinji Kikuhara, Itami (JP); Hitoshi Inoue, Itami (JP); Noboru Uenishi, Itami (JP); Satoshi Umemoto, Itami (JP)

(73) Assignee: A.L.M.T. Corp., Tokyo (JP)

( * ) Notice: Subject to any disclaimer, the term of this patent is extended or adjusted under 35 U.S.C. 154(b) by 564 days.

(21) Appl. No.: 12/085,376

(22) PCT Filed: Nov. 20, 2006

(86) PCT No.: PCT/JP2006/323077
§ 371 (c)(1),
(2), (4) Date: May 22, 2008

(87) PCT Pub. No.: WO2007/060907
PCT Pub. Date: May 31, 2007

(65) Prior Publication Data
US 2009/0169888 A1   Jul. 2, 2009

(30) Foreign Application Priority Data
Nov. 28, 2005  (JP) ................. 2005-342283

(51) Int. Cl.
*B22F 9/06* (2006.01)
*C22C 27/04* (2006.01)

(52) U.S. Cl. ............... 75/228; 75/248; 75/342; 75/351; 75/352; 419/22; 419/32; 419/34; 419/36; 419/38; 419/46; 419/53; 419/54

(58) Field of Classification Search ............ 75/228, 75/248, 342, 351, 352; 419/23, 32, 34, 36, 419/38, 46, 53, 54
See application file for complete search history.

(56) References Cited

U.S. PATENT DOCUMENTS
3,698,055 A * 10/1972 Holtz et al. ............... 75/246
4,012,230 A *  3/1977 Dickinson et al. ........ 419/25
(Continued)

FOREIGN PATENT DOCUMENTS
JP   50-11939   2/1975
(Continued)

OTHER PUBLICATIONS
European Search Report issued in European Patent Application No. 06 832 938.2-2122, mailed May 28, 2010.
(Continued)

*Primary Examiner* — H. (Holly) Le
(74) *Attorney, Agent, or Firm* — McDermott Will & Emery LLP

(57) ABSTRACT

Provided are an ancillary material, used for shape processing, which is capable of shortening a processing time, avoiding a reduction in quality of a shape provided to a workpiece material, and allowing a relatively low manufacturing cost; a processing method using the ancillary material; and a method of manufacturing the ancillary material. The tungsten alloy grains (1) comprise: tungsten of greater than or equal to 80% by mass and less than or equal to 98% by mass; nickel; at least one kind of metal selected from the group consisting of iron, copper, and cobalt; and an inevitable impurity, a maximum diameter thereof is greater than or equal to 0.1 mm and less than or equal to 5.00 mm, and a specific surface area thereof is less than or equal to 0.02 m$^2$/g. The tungsten alloy grains (1, 10), the workpiece material (30), an abrasive (20) are blended in a container (100) and the container is rotated, thereby processing the shape of the workpiece material (30). In the method of manufacturing the tungsten alloy grains (1), a granulated powder is stirred at a temperature greater than or equal to a softening point of an organic binder and thereafter, is cooled, thereby spheroidizing the granulated powder.

2 Claims, 6 Drawing Sheets

U.S. PATENT DOCUMENTS

| | | | |
|---|---|---|---|
| 4,129,444 A * | 12/1978 | Dreyer et al. | 75/252 |
| 4,762,559 A * | 8/1988 | Penrice et al. | 75/248 |
| 4,778,515 A * | 10/1988 | Kemp et al. | 75/342 |
| 4,885,028 A * | 12/1989 | Kopatz et al. | 75/346 |
| 4,931,252 A * | 6/1990 | Brunisholz et al. | 419/23 |
| 5,294,269 A * | 3/1994 | Lee et al. | 148/514 |
| 6,576,037 B1 * | 6/2003 | Bonneau et al. | 75/246 |
| 6,663,688 B2 * | 12/2003 | Findeisen et al. | 75/252 |

FOREIGN PATENT DOCUMENTS

| | | |
|---|---|---|
| JP | 4-124201 | 4/1992 |
| JP | 4-308003 | 10/1992 |
| JP | 5-192861 | 8/1993 |
| JP | 10-217084 | 8/1998 |
| JP | 2987911 | 10/1999 |
| JP | 2002-301654 | 10/2002 |
| JP | 2002-330042 | 11/2002 |

OTHER PUBLICATIONS

German, R.M., et al., "Kinetics of Liquid Phase Sintering", Materials Science and Engineering, 1988, pp. 215-224, A105/106, Elsevier Sequoia, The Netherlands.

* cited by examiner

TUNGSTEN ALLOY GRAINS, PROCESSING METHOD USING THE SAME, AND METHOD FOR MANUFACTURING THE SAME

This application is the U.S. National Phase under 35 U.S.C. §371 of International Application No. PCT/JP2006/323077, filed on Nov. 20, 2006, which in turn claims the benefit of Japanese Application No. 2005-342283, filed on Nov. 28, 2005, the disclosures of which Applications are incorporated by reference herein.

TECHNICAL FIELD

The present invention relates generally to tungsten alloy grains, a processing method using the tungsten alloy grains, and a method for manufacturing the tungsten alloy grains. More particularly, the present invention relates to tungsten alloy grains used for processing a shape of a piezoelectric element such as a crystal oscillator, an electron device, or the like; a processing method using the tungsten alloy grains; and a method for manufacturing the tungsten alloy grains.

BACKGROUND ART

Conventionally, a process of shaping a piezoelectric element such as a crystal oscillator, an electron device, or the like is performed in a manner in which an abrasive and a workpiece material are blended or an abrasive, an ancillary material, and a workpiece material are blended in a processing container, and the processing container is rotated.

For example, in Japanese Patent Application Laid-Open Publication No. 10-217084 (Patent Document 1), a method for manufacturing a rectangular AT vibrating reed is described. In this manufacturing method, an abrasive and rectangular AT vibrating reed are put into a spherical pot, and the spherical pot is rotated on an axis thereof and revolved around in a circular manner, thereby forming an inclination on a planar surface of the rectangular AT vibrating reed.

In addition, for example, in Japanese Patent Application Laid-Open Publication No. 2002-330042 (Patent Document 2), a beveling work method for a crystal oscillator or the like is described. In this work method, in addition to a piezoelectric blank plate of a crystal oscillator or the like and a work abrasive comprising alumina-based loose abrasive grains, a spherical or tabular ancillary material comprising ceramic, a resin material, a crystal material, metal, and the like is put into a work cylinder and the work cylinder is rotated, thereby performing the beveling work for the piezoelectric blank plate.

As described above, in the above-mentioned Publications, the ancillary material is added in order to increase a work efficiency in a process of shaping the piezoelectric element, the electron device, or the like. Note that the conventional tungsten alloy grains and manufacturing method thereof are described in Japanese Patent No. 2987911 (Patent Document 3) and Japanese Patent Application Laid-Open Publication No. 4-308003 (Patent Document 4).

Patent Document 1: Japanese Patent Application Laid-Open Publication No. 10-217084

Patent Document 2: Japanese Patent Application Laid-Open Publication No. 2002-330042

Patent Document 3: Japanese Patent No. 2987911

Patent Document 4: Japanese Patent Application Laid-Open Publication No. 4-308003

DISCLOSURE OF THE INVENTION

Problems to be Solved by the Invention

However, even with the conventional ancillary material added, there is a limit to shortening a processing time, and the process may take several days to ten days, leading to a large problem.

In addition, if a substance having a high specific gravity is used as the ancillary material, since the weight of the ancillary material itself is large and a weight which is exerted on a workpiece material is increased, a processing efficiency is improved. In other words, it is anticipated that the processing time can be shortened. However, it is required to consider not only shortening the processing time but also quality of a shape provided to the workpiece material, a manufacturing cost, and the like. For this reason, an ancillary material having a high specific gravity has not yet been put into practical use.

Therefore, an object of the present invention is to provide an ancillary material, used for shape processing, which is capable of shortening a processing time, avoiding a reduction in quality of a shape provided to a workpiece material, and allowing a relatively low manufacturing cost; a processing method using the ancillary material; and a method for manufacturing the ancillary material.

Means for Solving the Problems

Tungsten alloy grains according to the present invention comprises: tungsten of greater than or equal to 80% by mass and less than or equal to 98% by mass; nickel; at least one kind of metal selected from the group consisting of iron, copper, and cobalt; and an inevitable impurity, each having a maximum diameter of greater than or equal to 0.1 mm and less than or equal to 5.00 mm and having a specific surface area of less than or equal to 0.02 $m^2/g$. Note that to the extent that the effects of the present invention are not impaired, the tungsten alloy grains according to the present invention may contain elements other than nickel, iron, copper, and cobalt, and for example, may contain manganese, molybdenum, silicon, rhenium, chromium, titanium, vanadium, niobium, tantalum, etc.

It is preferable that in the tungsten alloy grains according to the present invention, a ratio at which elements other than the tungsten are present on an external surface of each of the tungsten alloy grains is larger than a ratio at which the elements other than the tungsten are present in an inside of each of the tungsten alloy grains.

It is preferable that the tungsten alloy grains according to the present invention are used to process a shape by being blended with a workpiece material.

It is preferable that in the tungsten alloy grains according to the present invention, a carbon content is less than or equal to 0.01% by mass.

In a processing method, according to the present invention, using the tungsten alloy grains, the tungsten alloy grains, a workpiece material, an abrasive are blended in a container and the container is rotated, thereby processing a shape of the workpiece material.

It is preferable that in the processing method, according to the present invention, using the tungsten alloy grains, the workpiece material is crystal chips.

A method, according to the present invention, for manufacturing tungsten alloy grains comprises the steps of blending a tungsten powder, a nickel powder, and at least one kind of a powder selected from the group consisting of an iron powder, a copper powder, and a cobalt powder; granulating the blended powder obtained at the blending step by adding an organic binder to the blended powder; spheroidizing the granulated powder obtained at the granulating step by stirring the granulated powder at a temperature greater than or equal to a softening point of the organic binder and thereafter, by cooling the powder; and sintering the granulated powder which has been subjected to the spheroidizing.

It is preferable that in the method for manufacturing the tungsten alloy grains according to the present invention, a ratio at which elements other than tungsten are present on an external surface of each of the tungsten alloy grains is larger than a ratio at which the elements other than the tungsten are present in an inside of each of the tungsten alloy grains.

Effect of the Invention

According to the present invention, since the tungsten alloy grains contain, as a chief ingredient, tungsten of greater than or equal to 80% by mass and less than or equal to 98% by mass, the tungsten alloy grains have a high specific gravity. Since the tungsten alloy grains are easier to machine than metal tungsten, a manufacturing cost is relatively low. Since a maximum diameter thereof is greater than or equal to 0.1 mm and less than or equal to 5.00 mm, when used as an ancillary material for shape processing, the tungsten alloy grains are capable of contributing to enhancing a processing efficiency. Since a specific surface area is less than or equal to 0.02 m$^2$/g, when used as the ancillary material for the shape processing, the tungsten alloy grains are capable of reducing a possibility of scratching a workpiece material, thereby preventing a reduction in quality of a shape provided to the workpiece material.

In addition, according to the present invention, the tungsten alloy grains each having a high specific gravity and a smooth surface can be obtained at a relatively low cost.

EXPLANATION OF REFERENCE NUMERALS

Figure 1:
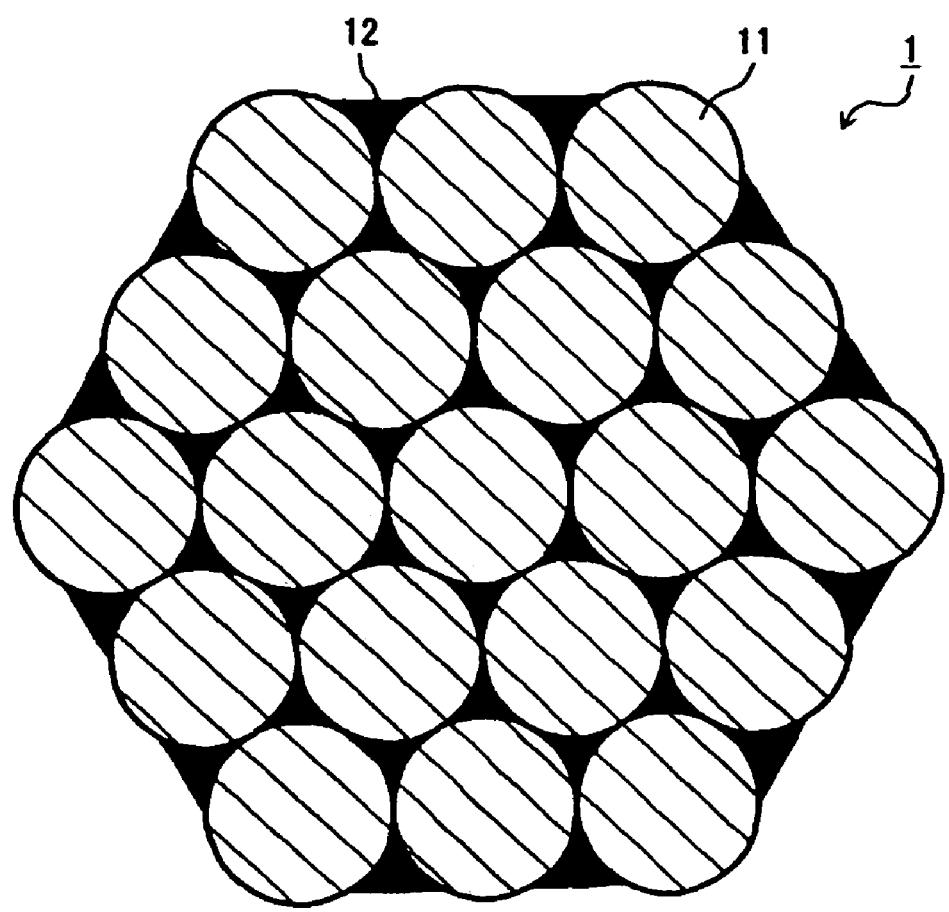
FIG. 1 is a schematic sectional view showing a tungsten alloy grain of the present invention.

1: tungsten alloy grains, 11: tungsten particles, 12: binder 10: ancillary material 20: abrasive, 30, 40, 50: workpiece material, 100: cylindrical container

BEST MODE FOR CARRYING OUT THE INVENTION

In order to obtain an ancillary material, used for shape processing, which is capable of shortening a processing time, avoiding a reduction in quality of a shape provided to a workpiece material, and allowing a relatively low manufacturing cost, the present inventors studied as follows.

First, as aspects which are required of an ancillary material suitable for practical use and having a high specific gravity, three characteristics can be pointed out: (a) having a smooth surface so as not to scratch a workpiece material; (b) having a relatively high specific gravity; and (c) allowing a relatively low manufacturing cost.

Steel and stainless steel used for the conventional ancillary material are easy to machine so as to attain the above-mentioned characteristic (a) and achieve the above-mentioned characteristic (c), whereas the steel and stainless steel do not accomplish the above-mentioned characteristic (b). Therefore, the ancillary material comprising the steel or stainless steel is less contributory to shortening a processing time.

In addition, as a material having a relatively higher specific gravity than that of the steel or stainless steel, metal tungsten can be cited. The metal tungsten attains the above-mentioned characteristic (b) and a material cost thereof is relatively low. However, since the metal tungsten is a very hard material, the metal tungsten is difficult to machine so as to achieve the above-mentioned characteristic (a) and do not accomplish the above-mentioned characteristic (c).

Further, as a material which is easy to machine and has a relatively high specific gravity, a tungsten alloy can be cited. The tungsten alloy attains the above-mentioned characteristics (b) and (c).

However, when using the conventional tungsten alloy material or tungsten alloy grains, it is difficult to machine the tungsten alloy material so as to have a smooth surface to achieve the above-mentioned characteristic (a). For example, the conventional tungsten alloy material is produced by preparing raw powder of tungsten, forming secondary grains as aggregates thereof, and sintering the secondary grains. At this time, since protruding portions or angular portions are present on surfaces of the secondary grains before the sintering, the protruding portions or angular portions remain present on a surface of the tungsten alloy material obtained by sintering the secondary grains.

The conventional secondary grains are formed by blending raw powder of the tungsten, a solvent, and an organic binder and granulating the blended powder through employing a spray-dryer method, a stirring method, a rolling method, or the like. Because the solvent is evaporated from the surfaces when the granulated powder obtained by this granulating process is dried, the surfaces of the secondary grains become lava-like, and the protruding portions or angular portions are present.

Further, the secondary grains may be formed by crushing a green compact. In such a case, since fracture surfaces are randomly formed on the surfaces of the secondary grains, the protruding portions or angular portions are present on the surface of the tungsten alloy material obtained by sintering the secondary grains, and a polyhedral tungsten alloy material is obtained.

On the surfaces of the conventional tungsten alloy grains each having a maximum diameter 0.1 to 0.5 mm, which are produced as described above, the protruding portions or angular portions each having a specific surface area of approximately 0.04 m$^2$/g are present. Such tungsten alloy grains each with the large specific surface area, due to the small maximum diameter of 0.1 to 0.5 mm, have substantial difficulty in reducing, through post-processing, the specific surface area to a level of less than or equal to 0.02 m$^2$/g which allows avoidance of scratching the workpiece material.

Based on the above-described examination, the present inventors have devoted themselves to studies, focusing attention on a process of manufacturing the tungsten alloy material. As a result, the present inventors have found that the tungsten alloy grains which are capable of achieving the above-mentioned object can be obtained by performing specific processing in the manufacturing process. Based on such findings by the present inventors, the present invention was produced.

Since the tungsten alloy grains of the present invention contain tungsten of greater than or equal to 80% by mass and less than or equal to 98% by mass as a chief ingredient, the tungsten alloy grains each have a high specific gravity of greater than or equal to 15 g/cm$^3$; it is easier to form a granular material thereof than that of metal tungsten; and the tungsten alloy grains are easy to machine, thereby attaining a relatively low manufacturing cost. It is preferable that a content of the tungsten is greater than or equal to 95% by mass and a specific gravity thereof is greater than or equal to 18 g/cm$^3$. If the content of the tungsten exceeds 98% by mass, although a high specific gravity exceeding 18.8 g/cm$^3$ can be obtained, properties thereof become close to those of pure tungsten, resulting in hard and brittle tungsten alloy grains. It is preferable that a total content of nickel, iron, copper, and cobalt is greater than or equal to 2% by mass and less than or equal to 20% by mass. If the total content of these elements is less than 2% by mass, properties thereof become close to those of pure tungsten, resulting in hard and brittle tungsten alloy grains. If the total content of these elements exceeds 20% by mass, a specific gravity of the tungsten alloy grains is reduced. It is more preferable that the total content of nickel, iron, copper, and cobalt is greater than or equal to 2% by mass and less than or equal to 5% by mass.

In addition, since the tungsten alloy grains of the present invention each have the maximum diameter of greater than or equal to 0.1 mm and less than or equal to 5.0 mm, when used as the ancillary material for shape processing, a state of blending with the abrasive becomes favorable, contributing to enhancing a processing efficiency, that is, shortening a processing time. In order to further shorten the processing time, it is preferable that the maximum diameter of each of the tungsten alloy grains is greater than or equal to 0.1 mm and less than or equal to 1.0 mm, and it is more preferable that the maximum diameter of each of the tungsten alloy grains is greater than or equal to 0.1 mm by mass and less than or equal to 0.5 mm.

Further, since the tungsten alloy grains of the present invention each have the specific surface area of less than or equal to 0.02 m$^2$/g, protruding portions or angular portions are hardly present on surfaces thereof. Therefore, when used as the ancillary material for shape processing, a possibility of scratching the workpiece material can be decreased, thereby preventing a reduction in quality of a shape provided to the workpiece material. It is preferable that the specific surface area of each of the tungsten alloy grains is less than or equal to 0.015 m$^2$/g, and it is more preferable that the specific surface area of each of the tungsten alloy grains is less than or equal to 0.01 m$^2$/g. Although it is preferable that the specific surface area of each of the tungsten alloy grains is small, it is desirable that the specific surface area of each of the tungsten alloy grains is at least greater than or equal to 0.001 m$^2$/g. It is difficult to manufacture tungsten alloy grains having a specific surface area smaller than 0.001 m$^2$/g, and a manufacturing cost is likely to be increased.

Even when the tungsten alloy grains obtained after the sintering are not subjected to post-processing or the tungsten alloy grains obtained after the sintering are hardly subjected to post-processing, the tungsten alloy grains of the present invention are capable of having the above-described features of the shape.

For a purpose of removing accretions such as fouling from the surfaces or of further reducing, even if only slightly, the specific surface area, the tungsten alloy grains of the present invention may be subjected to post-processing such as barrel-polishing and lapping-polishing.

As a factor or requisite which allows reducing, to less than or equal to 0.02 m$^2$/g, the specific surface area of the tungsten alloy grains of the present invention, it is considered that composition or a phase constituting external surfaces of the tungsten alloy grains is different from composition or a phase constituting insides of the tungsten alloy grains. Specifically, it is considered that a ratio at which elements other than the tungsten are present on the external surfaces of the tungsten alloy grains is larger than that at which the elements other than the tungsten are present in the insides of the tungsten alloy grains.

FIG. 1 is a schematic sectional view showing the tungsten alloy grain of the present invention.

In general, a tungsten alloy has a structural form in which tungsten particles are filled at a high density so as to attain a desired specific gravity and a binder comprising an element, other than tungsten, such as nickel (Ni), iron (Fe), and cobalt (Co) is filled around these tungsten particles and in interstices among the tungsten particles.

As shown in FIG. 1, an inside of a tungsten alloy grain 1 of the present invention, manufactured by employing the below-described manufacturing method, has a structural form in which tungsten particles 11 are filled at a high density so as to attain a desired specific gravity and a binder 12 comprising an element, other than tungsten, such as nickel (Ni), iron (Fe), and cobalt (Co) is filled around these tungsten particles and in interstices among the tungsten particles. In addition to this, in a state where the tungsten alloy grain 1 has been sintered, that is, a state where the tungsten alloy grain 1 has not been subjected to post-processing, an external surface of the tungsten alloy grain 1 is of a shape close to a sphere having a smooth surface and therefore, has a structural form in which a large amount of the binder 12 is filled in recesses, formed among the tungsten particles 11, which are exposed on the external surface thereof. Since the external surface of the tungsten alloy grain 1 of the present invention has the above-described structural form, a ratio at which elements other than the tungsten are present on the external surface of the tungsten alloy grain is larger than that at which the elements other than the tungsten are present in the inside of the tungsten alloy grain.

It is preferable that the ratio at which the elements other than the tungsten are present on the external surface of the tungsten alloy grain is within a range of 30 to 60% and the ratio at which the elements other than the tungsten are present in the inside of the tungsten alloy grain is within a range of 4 to 30%. If the ratio at which the elements other than the tungsten are present on the external surface of the tungsten alloy grain is less than 30%, asperities on the external surface become large, making it difficult to obtain a smooth external surface. If the ratio at which the elements other than the tungsten are present on the external surface of the tungsten alloy grain exceeds 60%, it is made substantially difficult to manufacture the tungsten alloy grain or a specific gravity of the whole tungsten alloy grain is reduced. On the other hand, if the ratio at which the elements other than the tungsten are present in the inside of the tungsten alloy grain is less than 4%, properties thereof become close to those of pure tungsten, resulting in a hard and brittle tungsten alloy grain. If the ratio at which the elements other than the tungsten are present in the inside of the tungsten alloy grain exceeds 30%, a specific gravity of the whole tungsten alloy grain is reduced, making it impossible to obtain a desired high specific gravity.

It is preferable that a carbon content of the tungsten alloy grain of the present invention is less than or equal to 0.01% by mass. If the carbon content exceeds 0.01% by mass, a hardness of the tungsten alloy grain is increased and therefore, when the tungsten alloy grains are used as the ancillary material for shape processing, it is more likely to scratch a workpiece material. Although a small amount of the carbon content is preferable, the carbon content of at least greater than or equal to 0.001% by mass is desirable. It is substantially difficult to manufacture a tungsten alloy grain having a carbon content of less than 0.001% by mass, and a manufacturing cost is likely to be increased. As a hardness of the tungsten alloy grain of the present invention, a Vickers hardness of greater than or equal to 200 and less than or equal to 400 under a load of 5 kg is preferable. If the hardness of the tungsten alloy grain is less than 200, wear caused by an abrasion occurring when the tungsten alloy grains are used as the ancillary material is increased. If the hardness of the tungsten alloy grain exceeds 400, it is more likely that the tungsten alloy grains scratches a workpiece material.

The tungsten alloy grains of the present invention are used for shape processing by being blended with a workpiece material. In a processing method using the tungsten alloy grains of the present invention, the tungsten alloy grains having the above-described features, a workpiece material, and an abrasive are blended in a container, and the container is rotated, thereby conducting shape processing of the workpiece material. Specifically, for example, in a case where as the ancillary material used in convex processing, beveling processing, etc., the tungsten alloy grains of the present invention are used by being blended with the workpiece material for the shape processing, a processing time can be shortened to approximately ⅓, as compared with a case where the conventional ancillary material is used. It is preferable that the workpiece material is crystal chips.

Figure 2:
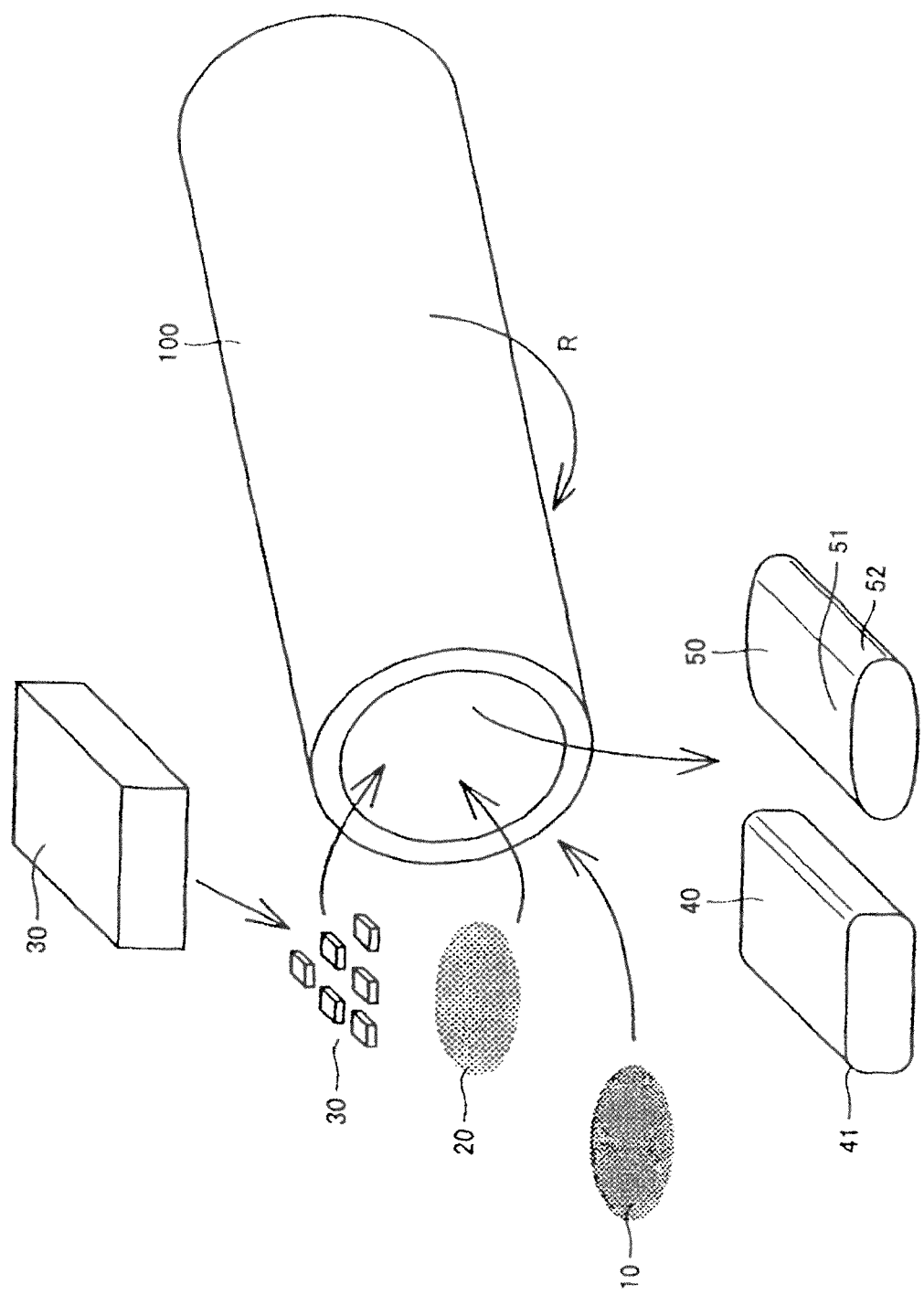
FIG. 2 is a conceptual diagram showing a processing method in which the tungsten alloy grains of the present invention are used as an ancillary material and crystal as a workpiece material is subjected to beveling processing.

FIG. 2 is a conceptual diagram showing a processing method in which the tungsten alloy grains of the present invention are used as the ancillary material and crystal, as a workpiece material, is subjected to the beveling processing. Here, the beveling processing is a process in which round curved surfaces are formed on principal surfaces and side surfaces of a blank plate of a piezoelectric element such as a crystal oscillator.

As shown in FIG. 2, for example, contained in a cylindrical container 100 having an outside diameter of 50 mm are the tungsten alloy grains of the present invention as an ancillary material 10; an alumina-based abrasive as an abrasive 20; and blank plates (rectangular-parallelepiped-shaped) of crystal oscillators as a workpiece material 30, and the cylindrical container 100 is rotated in a direction indicated by an arrow R. In this way, as shown in a figure of a workpiece material 40 which has been subjected to the processing, round curved surfaces 41 are formed on angular portions. As shown in a figure of a workpiece material 50 which has been subjected to the processing, round curved surfaces 51 are formed on principal surfaces of the blank plate and round curved surfaces 52 are formed on side surfaces of the blank plate.

The tungsten alloy grains of the present invention are manufactured in the following method.

First, a tungsten powder, a nickel powder, and a powder containing at least one kind selected from the group consisting of an iron powder, a copper powder, and a cobalt powder are blended.

Next, an organic binder is added to the blended powder obtained in the blending process, whereby granulation is conducted. As a granulation method, a variety of granulation methods such as a spray-dryer method, a stirring method, and a rolling method may be employed. As the organic binder, paraffin, acryl resin, polyvinyl alcohol, polyvinyl butyral, etc. may be used.

The granulated powder obtained in the granulation process is stirred at a temperature of greater than or equal to a softening point (a glass transition point) of the organic binder and thereafter, is cooled, whereby spheroidization is conducted. At this time, the softened granulated powder is stirred and rolled, whereby protruding portions or angular portions which are present on surfaces of secondary grains are rounded and the granulated powder having smooth surfaces can be obtained. The spheroidized granulated powder is sieved to separate the granulated powder having a maximum diameter of greater than or equal to 0.1 mm and less than or equal to 5.0 mm. If the maximum diameter is less than 0.1 mm, since a mass of a single grain is decreased, the tungsten alloy grains do not function as the ancillary material for the shape processing. If the maximum diameter exceeds 5.0 mm, when the tungsten alloy grains are used as the ancillary material for the shape processing, a state of blending with the abrasive is worsened, thereby failing to contribute to shortening the processing time.

Thereafter, the above-mentioned spheroidized granulated powder is sintered. At this time, in order to prevent bonding among grains of the granulated powder, it is preferable that the sintering is conducted in alumina. In order to avoid formation of protruding portions or angular portions on the surfaces of the grains, which may arise by utilizing a surface tension of a liquefied binder component, it is preferable that the sintering is conducted at a temperature which is 10° C. or more higher than a liquid phase temperature of nickel, iron, copper, or cobalt, which is a binder ingredient other than tungsten. In addition, in order to reduce a carbon content which is an inevitable impurity, it is desirable that while the temperature is rising during the sintering, a temperature in a range of 1000° C. to 1200° C. is maintained for 2 or more hours.

In the above-described embodiment, the example in which the tungsten alloy grains of the present invention are used as the ancillary material for the shape processing is described. However, the present invention may be directed to other applications through taking advantage of the characteristics that the tungsten alloy grains have the high specific gravity and that the surfaces thereof are smooth.

EXAMPLES

Hereinafter, one example of the present invention will be described.

In accordance with blending composition of raw material powders, kinds and addition ratios of organic binders, and manufacturing conditions (spheroidization processing, sintering temperatures) shown in Table 1, ancillary materials in Examples 1 to 10 and Comparison Examples 1 to 2 were prepared.

First, a tungsten (W) powder, a nickel (Ni) powder, an iron (Fe) powder, a copper (Cu) powder, and a cobalt (Co) powder were blended at mass percentages shown in Table 1 and mixed for one hour by using a mixer. Thereafter, the kinds of the organic binders were added, at mass percentages shown in Table 1, to the above-mentioned metal-blended powders, thereby preparing granulated powders. Here, a softening point of paraffin used as the organic binder is 70° C. and a softening point of acryl resin used as the organic binder is 110° C.

In Examples 1 to 9 and Comparison Example 2, melted paraffin was added as the organic binder to the above-mentioned metal-blended powders and mixed, with heat being applied thereto, for 10 minutes until homogeneity was attained; and each of these mixtures was put into a stainless steel container, cooled through water-cooling, and crushed by using a hammer, thereby preparing the granulated powders.

In Example 10, acryl resin as the organic binder and 5% by mass of $C_3H_7Br$ as a solvent were added to the above-mentioned metal-blended powder and mixed for 2 hours by using a Henschel mixer, and the $C_3H_7Br$ was evaporated through drying by using a vacuum pump, thereby preparing the granulated powder.

In Examples 1 to 10, the obtained granulated powders were stirred by using an agitator under conditions of temperatures and time periods shown in Table 1 and thereafter, cooled, thereby conducting the spheroidization.

The granulated powders in Examples 1 to 10 and Comparison Example 2, obtained after the spheroidization, were sieved by using a sieve mesh. In Examples 1 to 3, Examples 6 to 10, and Comparison Example 2, a sieve mesh with a Tyler mesh size #28 to #115 (sieve opening of 0.60 to 0.125 mm) was used. In Example 4, a sieve mesh with a Tyler mesh size #14 to #115 (sieve opening of 1.18 to 0.125 mm) was used. In Example 5, a sieve mesh with a Tyler mesh size #3.5 to #115 (sieve opening of 5.66 to 0.125 mm) was used.

The granulated powders, which were separated through the sieving, in Examples 1 to 10 and Comparison Example 2 were sintered in the alumina for 2 hours at the sintering temperatures shown in Table 1, thereby preparing the tungsten alloy grains as the ancillary materials.

Note that in Comparison Example 1, a commercially-available copper (Cu) powder was used as the ancillary material as it was.

Figure 3:
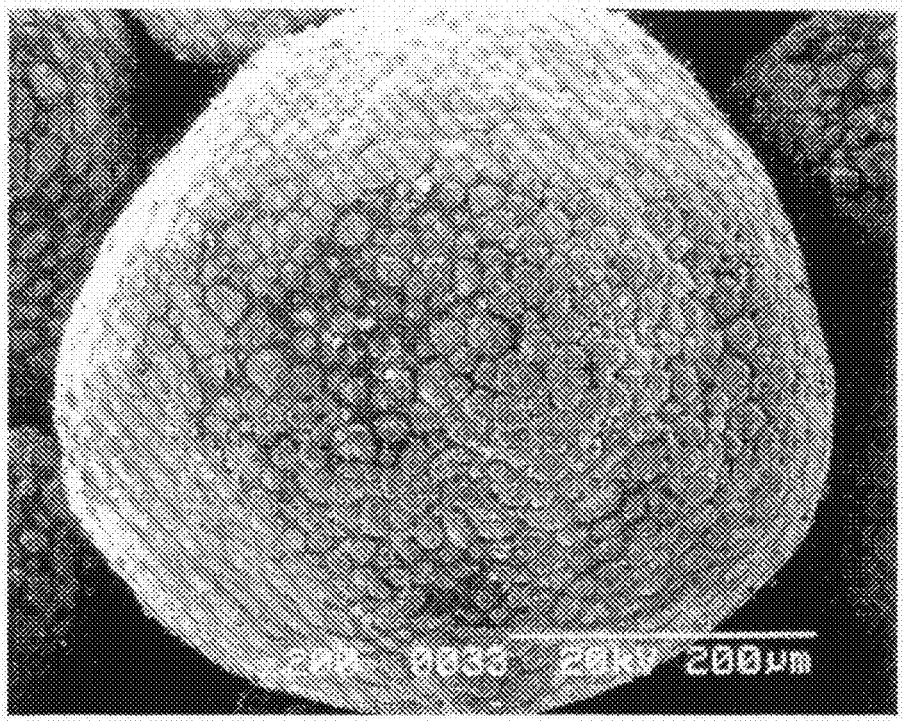
FIG. 3 shows a scanning electron microscope photograph of tungsten alloy grains obtained in Example 1.
Figure 4:
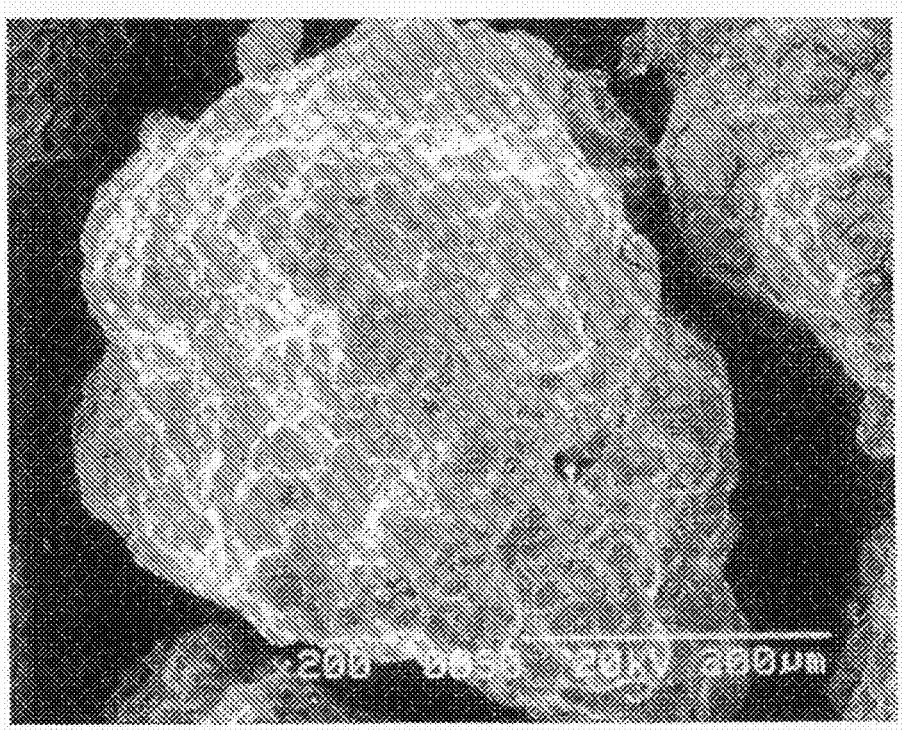
FIG. 4 shows a scanning electron microscope photograph of tungsten alloy grains obtained in Comparison Example 2.

FIG. 3 shows a scanning electron microscope (SEM) photograph (magnification: ×200) of the tungsten alloy grains obtained in Example 1. FIG. 4 shows a scanning electron microscope (SEM) photograph (magnification: ×200) of the tungsten alloy grains obtained in Comparison Example 2. It can be seen that as shown in FIG. 4, the protruding portions or angular portions are present on the surfaces of the conventional tungsten alloy grains, whereas as shown in FIG. 3, the tungsten alloy grains of the present invention have smooth surfaces.

Figure 5:
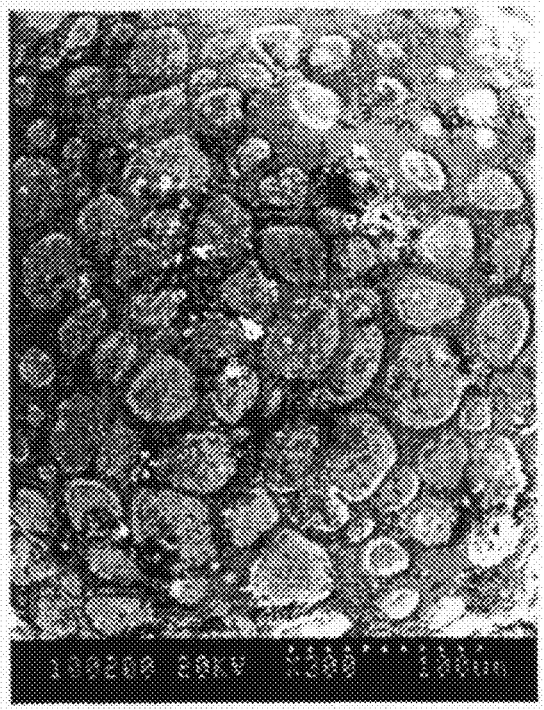
FIG. 5 shows a scanning electron microscope photograph of an external surface of the tungsten alloy grain obtained in Example 1.
Figure 6:
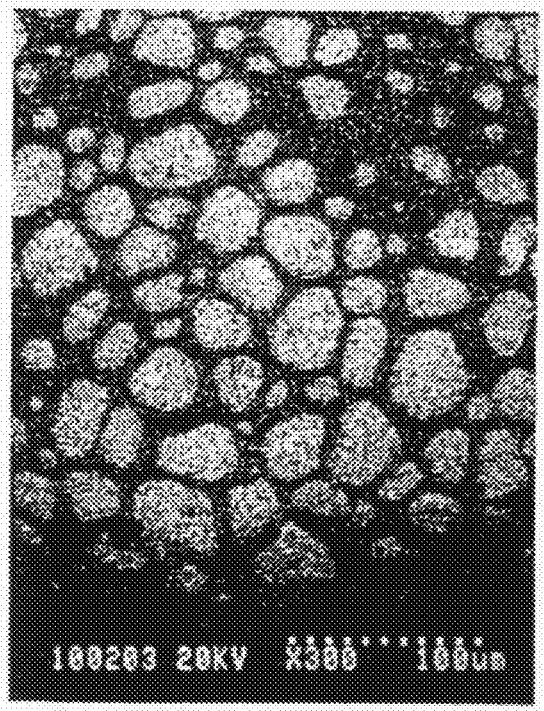
FIG. 6 shows a result of a surface analysis of a tungsten element in the scanning electron microscope photograph shown in FIG. 5, which was conducted through an energy dispersive X-ray analysis.
Figure 7:
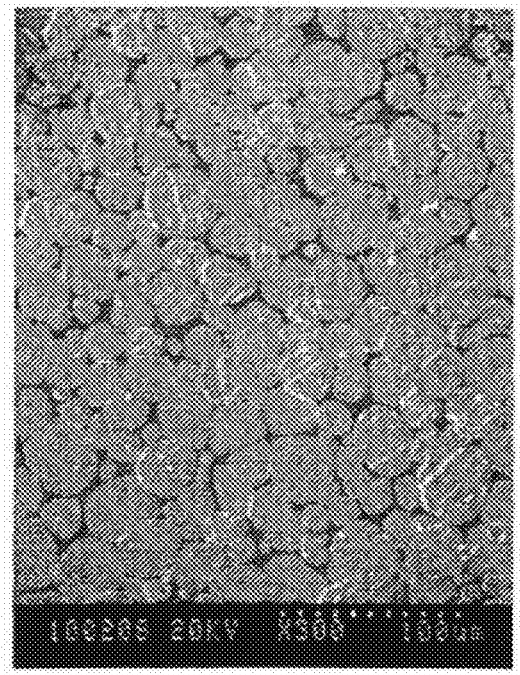
FIG. 7 shows a scanning electron microscope photograph of an inside of the tungsten alloy grain obtained in Example 1.
Figure 8:
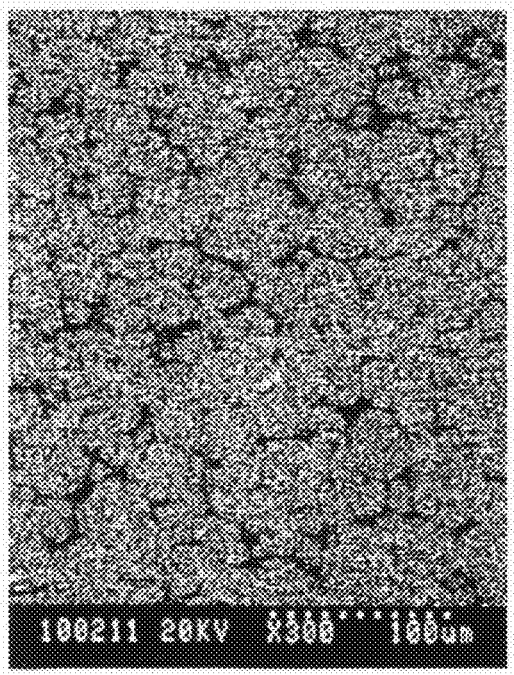
FIG. 8 shows a result of a surface analysis of a tungsten element in the scanning electron microscope photograph shown in FIG. 7, which was conducted through the energy dispersive X-ray analysis.

FIG. 5 shows a scanning electron microscope (SEM) photograph (magnification: ×300) of the external surface of the tungsten alloy grain obtained in Example 1. FIG. 6 shows a result of a surface analysis of the tungsten element in the scanning electron microscope photograph shown in FIG. 5, which was conducted through an energy dispersive X-ray analysis (EDX). FIG. 7 shows a scanning electron microscope (SEM) photograph (magnification: ×300) of the inside of the tungsten alloy grain obtained in Example 1. FIG. 8 shows a result of a surface analysis of the tungsten element in the scanning electron microscope photograph shown in FIG. 7, which was conducted through an energy dispersive X-ray analysis (EDX). Note that in the results, shown in FIG. 6 and FIG. 8, of the surface analyses conducted through the EDX, the portions indicated by white dots show presence of the tungsten element.

It can be seen that on the external surface of the tungsten alloy grain, as shown in FIG. 5, a ratio at which the binder filled around the tungsten particles and in interstices among the tungsten particles is present is relatively large, and as shown in FIG. 6, a ratio at which the elements other than the tungsten are present (black portions) is relatively large. By contrast, it can be seen that in the inside of the tungsten alloy grain, as shown in FIG. 7, a ratio at which the binder filled around the tungsten particles and in the interstices among the tungsten particles is present is relatively small and as shown in FIG. 8, a ratio at which the elements other than the tungsten are present (black portions) is relatively small.

The ratios at which the elements other than the tungsten are present on the external surface and in the inside of the tungsten alloy grain shown in FIG. 5 and FIG. 7 are calculated as described below.

Figure 9:
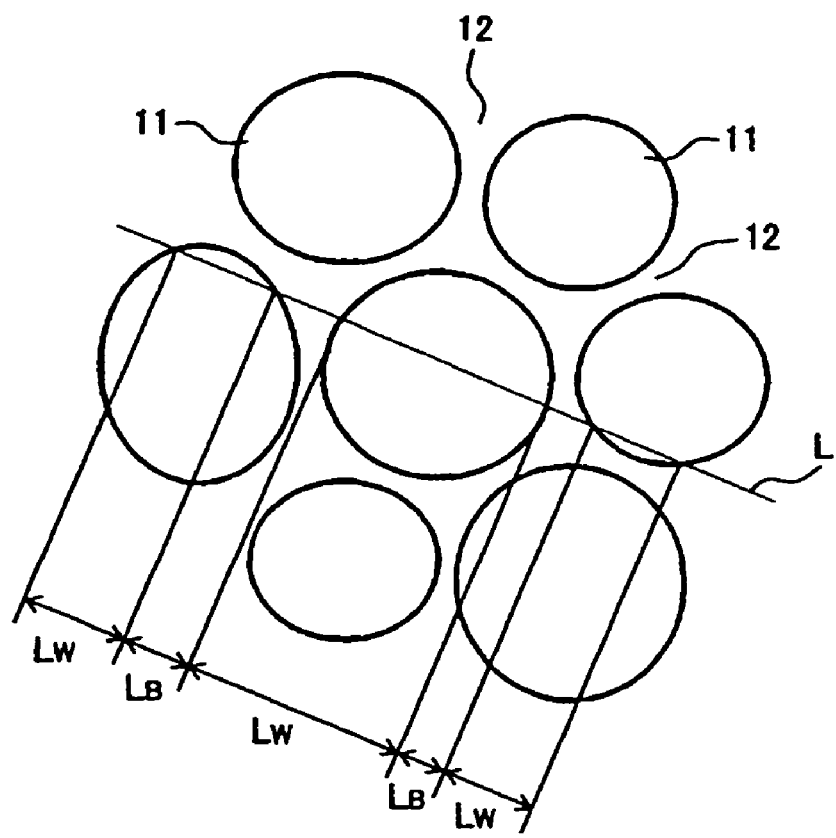
FIG. 9 is a diagram showing a method of calculating ratios at which elements other than tungsten are present in the scanning electron microscope photographs of the external surface and the inside of the tungsten alloy grain.

FIG. 9 is a diagram showing a method of calculating the ratios at which the elements other than the tungsten are present in the scanning electron microscope photographs of

TABLE 1

|  |  | Composition [% by mass] |  |  |  |  | Organic binder |  | Spheroidization processing |  | Sintering temperature [° C.] |
|---|---|---|---|---|---|---|---|---|---|---|---|
|  | No | W | Ni | Fe | Cu | Co | Kind | [% by mass] | Temperature [° C.] | Time [min] |  |
| Example | 1 | 97 | 2 | 1 | 0 | 0 | Paraffin | 2.0 | 110 | 30 | 1490 |
|  | 2 | 97 | 2 | 1 | 0 | 0 | Paraffin | 2.0 | 110 | 20 | 1490 |
|  | 3 | 97 | 2 | 1 | 0 | 0 | Paraffin | 2.0 | 110 | 10 | 1490 |
|  | 4 | 97 | 2 | 1 | 0 | 0 | Paraffin | 2.0 | 110 | 30 | 1490 |
|  | 5 | 97 | 2 | 1 | 0 | 0 | Paraffin | 2.0 | 110 | 30 | 1490 |
|  | 6 | 97 | 2 | 1 | 0 | 0 | Paraffin | 5.0 | 110 | 30 | 1490 |
|  | 7 | 90 | 7.5 | 0 | 2.5 | 0 | Paraffin | 2.0 | 110 | 30 | 1450 |
|  | 8 | 95 | 3.3 | 0 | 0 | 1.7 | Paraffin | 2.0 | 110 | 30 | 1500 |
|  | 9 | 80 | 15 | 0 | 5 | 0 | Paraffin | 2.0 | 110 | 30 | 1450 |
|  | 10 | 97 | 2 | 1 | 0 | 0 | Acryl | 1.2 | 150 | 30 | 1490 |
| Comparison Example | 1 |  |  |  |  |  | A commercially-available Cu powder used. |  |  |  |  |
|  | 2 | 97 | 2 | 1 | 0 | 0 | Paraffin | 2.0 | Not conducted. |  | 1490 | the external surface and the inside of the tungsten alloy grain. Here, a surface of the inside is obtained by embedding the tungsten alloy grain in a heat-hardening resin and conducting four successive polishing processes: a polishing process using #200 sandpaper; a polishing process using #800 sandpaper; a lapping-polishing process using an alumina powder having a particle diameter of 5 μm; and a lapping-polishing process using an alumina powder having a particle diameter of 1 μm. As shown in FIG. 9, in the SEM photographs (magnification: ×300) (FIG. 5 and FIG. 7) of the external surface and the inside of the tungsten alloy grain, 10 line segments L each having a length of 50 mm are randomly drawn (in FIG. 9, one line segment is shown). Lengths along which each of the line segments L traverses the tungsten particle 11 and the binder 12 respectively are measured. It is supposed that the length along which each of the line segments L traverses the tungsten particle 11 is LW and that each of the line segments L traverses the binder 12 is LB. By using the following equation, a ratio at which the binder is present is calculated.

(Ratio at which the binder is present)={(a total sum of the lengths $LB$)/(the whole length of the line segment, i.e., a sum of $LW$ and $LB$)}×100[%]

An average value of the ratios (at which the binder is present) calculated with respect to the randomly drawn 10 line segments is supposed to be (the ratio at which the elements other than the tungsten are present).

The calculations in FIG. 5 and FIG. 7 were carried out as described above, thereby obtaining results that the ratios at which the elements other than the tungsten are present on the external surface of the tungsten alloy grain and in the inside of the tungsten alloy grain were 46.1% and 7.6%, respectively; and that the ratios at which the tungsten element is present on the external surface of the tungsten alloy grain and in the inside of the tungsten alloy grain were 53.9% and 92.4%, respectively.

FIG. 2, each of the ancillary materials 10 obtained in Examples 1 to 10 and Comparison Examples 1 to 2, the alumina-based abrasive as the abrasive 20, and the workpiece material 30 were blended in the cylindrical container 100 having the outside diameter of 50 mm; and the cylindrical container 100 was rotated in the direction indicated by the arrow R at a rotation speed 80 rpm. In this way, as shown in a figure of the workpiece material 40 obtained after the processing, round curved surfaces 41 were formed on angular portions. A processing time (h) taken until the round corners each having a radius of greater than or equal to 5 μm were formed at the angular portions; and a ratio at which the workpieces having polishing scratches, which can be observed by using a 20× stereoscopic microscope, were obtained were measured. The results thereof are shown in Table 2.

Note that the ratio at which the workpieces having the polishing scratches were obtained was evaluated as follows.

⊚: The ratio at which the workpieces having the polishing scratches, which can be observed by using the 20× stereoscopic microscope, were obtained is less than 1%.

○: The ratio at which the workpieces having the polishing scratches, which can be observed by using the 20× stereoscopic microscope, were obtained is greater than or equal to 1% and less than 5%.

Δ: The ratio at which the workpieces having the polishing scratches, which can be observed by using the 20× stereoscopic microscope, were obtained is greater than or equal to 5% and less than 20%.

x: The ratio at which the workpieces having the polishing scratches, which can be observed by using the 20× stereoscopic microscope, were obtained is greater than or equal to 20%.

TABLE 2

|  | No | Range of a maximum diameter [mm] | Specific gravity | Specific surface area [m²/g] | C content [% by mass] | Processing time [h] | Ratio of obtaining workpieces with scratches |
|---|---|---|---|---|---|---|---|
| Example | 1 | 0.1 to 0.5 | 18.6 | 0.009 | 0.002 | 60 | ⊚ |
|  | 2 | 0.1 to 0.5 | 18.6 | 0.012 | 0.002 | 60 | ○ |
|  | 3 | 0.1 to 0.5 | 18.6 | 0.018 | 0.002 | 60 | Δ |
|  | 4 | 0.1 to 1.0 | 18.6 | 0.007 | 0.002 | 76 | ⊚ |
|  | 5 | 0.1 to 5.0 | 18.6 | 0.002 | 0.002 | 105 | ⊚ |
|  | 6 | 0.1 to 0.5 | 18.6 | 0.009 | 0.012 | 60 | Δ |
|  | 7 | 0.1 to 0.5 | 17.1 | 0.009 | 0.002 | 70 | ⊚ |
|  | 8 | 0.1 to 0.5 | 18.1 | 0.009 | 0.002 | 64 | ⊚ |
|  | 9 | 0.1 to 0.5 | 15.4 | 0.010 | 0.002 | 84 | ⊚ |
|  | 10 | 0.1 to 0.5 | 18.6 | 0.009 | 0.002 | 60 | ⊚ |
| Comparison Example | 1 | 0.1 to 0.5 | 8.9 | 0.005 | 0.003 | 144 | ⊚ |
|  | 2 | 0.1 to 0.5 | 18.6 | 0.04 | 0.002 | 60 | X |

Table 2 shows a range of a maximum diameter of the obtained ancillary material, a specific gravity, a specific surface area measured in conformity with JIS R1626 (gas adsorption BET method), and a carbon content (C content) which is one of inevitable impurities. Note that the carbon content was measured by employing an ICP (Inductively Coupled Plasma: high-frequency inductively-coupled plasma) emission spectrophotometry.

In order to perform beveling processing of artificial crystal as a workpiece material 30 (each having a rectangular parallelepiped shape having dimensions of 4 mm×1.8 mm×0.8 mm) by using the obtained ancillary materials, as shown in It can be seen from Table 2 that when the commercially-available copper powder in Comparison Example 1 is used as the ancillary material, the degree of obtaining the workpieces with the scratches is low whereas the processing time is increased. In addition, when the tungsten alloy grain in Comparison Example 2 is used as the ancillary material, the processing time can be shortened whereas the degree of obtaining the workpieces with the scratches is high. By contrast, when the tungsten alloy grains in Examples 1 to 10 of the present invention are used as the ancillary material, not only the processing time can be shortened but also the ratio at which the workpieces with the scratches are obtained can be reduced to less than 20%.

The described embodiment and examples are to be considered in all respects only as illustrative and not restrictive. It is intended that the scope of the invention is, therefore, indicated by the appended claims rather than the foregoing description of the embodiment and examples and that all modifications and variations coming within the meaning and equivalency range of the appended claims are embraced within their scope.

INDUSTRIAL APPLICABILITY

The tungsten alloy grains according to the present invention are used as an ancillary material for processing shapes of a piezoelectric element such as a crystal oscillator, an electron device, and the like.

The invention claimed is:

1. A method for manufacturing tungsten alloy grains, the method comprising steps of:
blending a tungsten powder, a nickel powder, and at least one kind of a powder selected from the group consisting of an iron powder, a copper powder, and a cobalt powder;
granulating the blended powder obtained at the blending step by adding an organic binder to the blended powder;
spheroidizing the granulated powder obtained at the granulating step by stirring the granulated powder to obtain a softened granulated powder at a temperature greater than or equal to a softening point of the organic binder and thereafter, cooling the powder; and
sintering the granulated powder which has been subjected to the spheroidizing to obtain the tungsten alloy grains,
wherein the tungsten alloy grains obtained have a maximum diameter greater than or equal to 0.1 mm and less than or equal to 5.0 mm and a specific surface area less than or equal to $0.02\ m^2/g$.

2. The method for manufacturing the tungsten alloy grains according to claim 1, wherein a ratio at which elements other than tungsten are present on an external surface of each of the tungsten alloy grains is larger than a ratio at which the elements other than the tungsten are present in an inside of each of the tungsten alloy grains.

* * * * *